United States Patent
Nakhjavani

(10) Patent No.: US 10,878,038 B2
(45) Date of Patent: Dec. 29, 2020

(54) SEARCHING MULTIMODAL SPACES

(71) Applicant: The Boeing Company, Chicago, IL (US)

(72) Inventor: Omid B. Nakhjavani, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 227 days.

(21) Appl. No.: 16/221,412

(22) Filed: Dec. 14, 2018

(65) Prior Publication Data

US 2020/0192944 A1   Jun. 18, 2020

(51) Int. Cl.
| | |
|---|---|
| G06F 16/903 | (2019.01) |
| G06F 17/17 | (2006.01) |
| G06F 17/13 | (2006.01) |
| G06F 16/9038 | (2019.01) |
| G06F 16/904 | (2019.01) |

(52) U.S. Cl.
CPC ...... *G06F 16/90335* (2019.01); *G06F 16/904* (2019.01); *G06F 16/9038* (2019.01); *G06F 17/13* (2013.01); *G06F 17/175* (2013.01)

(58) Field of Classification Search
CPC .......... G06F 16/90335; G06F 16/9038; G06F 16/904; G06F 17/13; G06F 17/175
See application file for complete search history.

(56) References Cited

U.S. PATENT DOCUMENTS

| | | | |
|---|---|---|---|
| 2012/0128207 A1* | 5/2012 | Manabe | G06T 7/12 382/103 |
| 2013/0339411 A1* | 12/2013 | Bogosian | G06F 16/29 708/207 |

* cited by examiner

*Primary Examiner* — Jay A Morrison
(74) *Attorney, Agent, or Firm* — Kunzler Bean & Adamson

(57) ABSTRACT

A method comprises mapping a plurality of variable values of a database in a multi-dimensional search space, each dimension corresponding to a variable of the database. The method comprises defining a surface within the multi-dimensional search space based on a plurality of search points defined by values for at least a pair of variables, the surface comprising a closed-loop, convex shape that defines an area of the multi-dimensional search space that has been searched. The method comprises repositioning at least one search point of the plurality of search points within the multi-dimensional search space based on a target objective, the at least one search point of the plurality of search points moved a predefined distance in a direction of the target objective such that the shape of the surface is changed while maintaining a closed-loop, convex shape. The method comprises reporting the variable values for the plurality of search points.

20 Claims, 6 Drawing Sheets

SEARCHING MULTIMODAL SPACES

FIELD

This disclosure relates generally to searching data, and more particularly to a deterministic global method for searching multimodal spaces.

BACKGROUND

Data management and preparation play an important role for data analytics and machine learning. Searching and managing big data and getting access to correct data can be challenging and time consuming. Retrieving data in an efficient manner is important for making data analytics, machine learning, and other data-centric applications feasible.

SUMMARY

The subject matter of the present application has been developed in response to the present state of the art, and in particular, in response to the problems and disadvantages associated with conventional data searching methods. Accordingly, the subject matter of the present application has been developed to improve an accuracy, efficiency, effectiveness, and/or the like of searching large data sets using a level-set method that overcomes at least some of the above-discussed shortcomings of prior art techniques.

Disclosed herein is a method. The method comprises mapping a plurality of variable values of a database in a multi-dimensional search space. Each dimension corresponds to a variable of the database. The method also comprises defining a surface within the multi-dimensional search space based on a plurality of search points defined by values for at least a pair of variables. The surface comprises a closed-loop, convex shape that defines an area of the multi-dimensional search space that has been searched. The method further comprises repositioning at least one search point of the plurality of search points within the multi-dimensional search space based on a target objective. The at least one search point of the plurality of search points are moved a predefined distance in a direction of the target objective such that the shape of the surface is changed while maintaining a closed-loop, convex shape. The method additionally comprises reporting the variable values for the plurality of search points. The preceding subject matter of this paragraph characterizes example 1 of the present disclosure.

The method further comprises initially defining the surface by selecting a random starting search point within the multi-dimensional search space, finding a first local minimum in the multi-dimensional search space using a multi-variable, unconstrained optimization method from the starting search point, initiating one or more one-dimensional searches in equally spaced directions to locate one or more maxima points, and connecting the maxima points to form the surface, the surface comprising a simplex shape. The preceding subject matter of this paragraph characterizes example 2 of the present disclosure, wherein example 2 also includes the subject matter according to example 1, above.

The method further comprises initially defining the surface using a level-set method by defining a circular surface within the multi-dimensional search space, selecting a predetermined number of points along a perimeter of the circular surface, calculating a partial differential equation using a Hamilton-Jacobi equation using the selected predetermined number of points to calculate a new closed surface towards the target objective. The preceding subject matter of this paragraph characterizes example 3 of the present disclosure, wherein example 3 also includes the subject matter according to any one of examples 1-2, above.

The method further comprises repositioning at least one search point of the plurality of search points by generating a closed surface comprising triangular surfaces based on the existing surface within the multi-dimensional search space using a Nelder-Mead method such that vertices of the triangular surfaces are adjacent vertices, determining a midpoint of each triangular surface, creating a linear vector from each of the closed-loop vertices to the midpoint of the opposing triangular surface, and defining a new closed-loop, convex shape using a predefined length of each linear vector based on ends of the linear vectors being vertices for the new closed-loop, convex shape. The preceding subject matter of this paragraph characterizes example 4 of the present disclosure, wherein example 4 also includes the subject matter according to any one of examples 1-3, above.

The at least one search point of the plurality of search points are repositioned in a direction and at a distance that is less than or equal to a variable value that satisfies a threshold sensitivity for the variable based on the target objective. The preceding subject matter of this paragraph characterizes example 5 of the present disclosure, wherein example 5 also includes the subject matter according to any one of examples 1-4, above.

The method further comprises calculating one or more Lagrange values using various variable values along the direction of the repositioned search point to determine sensitivity of the variable values along the direction up to the distance. The preceding subject matter of this paragraph characterizes example 6 of the present disclosure, wherein example 6 also includes the subject matter according to example 5, above.

The method further comprises storing information for each iteration of the surface to prevent re-searching within the area of the surface. The information comprises one or more of a size of the surface, the current variable values, the search time for that surface, and a percentage of the search space that the surface encompasses. The preceding subject matter of this paragraph characterizes example 7 of the present disclosure, wherein example 7 also includes the subject matter according to any one of examples 1-6, above.

The method further comprises iteratively repositioning the at least one search point of the plurality of search points to change the search area that the surface covers until the search criteria is satisfied. The preceding subject matter of this paragraph characterizes example 8 of the present disclosure, wherein example 8 also includes the subject matter according to any one of examples 1-7, above.

The search criteria comprises one or more of a search time, a percentage of search space, and achieving the target objective. The preceding subject matter of this paragraph characterizes example 9 of the present disclosure, wherein example 9 also includes the subject matter according to example 8, above.

The method further comprises receiving user input prior to defining the surface within the multi-dimensional search space. The user input comprises one or more of a random initial search point, a target objective, a search time constraint, and a percentage of the search space to be searched. The preceding subject matter of this paragraph characterizes example 10 of the present disclosure, wherein example 10 also includes the subject matter according to any one of examples 1-9, above.

Further disclosed herein is an apparatus. The apparatus comprises a processor and a memory that stores code executable by the processor to map a plurality of variable values of a database in a multi-dimensional search space. Each dimension corresponds to a variable of the database. The code is further executable by the processor to define a surface within the multi-dimensional search space based on a plurality of search points defined by values for at least a pair of variables. The surface comprises a closed-loop, convex shape that defines an area of the multi-dimensional search space that has been searched. The code is further executable by the processor to reposition at least one search point the plurality of search points within the multi-dimensional search space based on a target objective. The at least one search point the plurality of search points are moved a predefined distance in a direction of the target objective such that the shape of the surface is changed while maintaining a closed-loop, convex shape. The code is further executable by the processor to report the variable values for the plurality of search points. The preceding subject matter of this paragraph characterizes example 11 of the present disclosure.

The code is further executable by the processor to initially define the surface by selecting a random starting search point within the multi-dimensional search space, finding a first local minimum in the multi-dimensional search space using a multivariable, unconstrained optimization method from the starting search point, initiating one or more one-dimensional searches in equally-spaced directions to locate one or more maxima points, and connecting the maxima points to form the surface, the surface comprising a simplex shape. The preceding subject matter of this paragraph characterizes example 12 of the present disclosure, wherein example 12 also includes the subject matter according to example 11, above.

The code is further executable by the processor to initially define the surface using a level-set method by defining a circular surface within the multi-dimensional search space, selecting a predetermined number of points along a perimeter of the circular surface, calculating a partial differential equation using a Hamilton-Jacobi equation by employing the selected predetermined number of points to calculate a new closed surface towards the target objective. The preceding subject matter of this paragraph characterizes example 13 of the present disclosure, wherein example 13 also includes the subject matter according to any one of examples 11-12, above.

The code is further executable by the processor to reposition at least one search point of the plurality of search points by generating a closed surface comprising triangular surfaces based on the existing surface within the multi-dimensional search space using a Nelder-Mead method, such that vertices of the triangular surfaces are adjacent vertices, determining a midpoint of each triangular surface, creating a linear vector from each of the closed-loop vertices to the midpoint of the opposing triangular surface, and defining a new closed-loop, convex shape using a predefined length of each linear vector based on ends of the linear vectors being vertices for the new closed-loop, convex shape. The preceding subject matter of this paragraph characterizes example 14 of the present disclosure, wherein example 14 also includes the subject matter according to any one of examples 11-13, above.

The at least one search point of the plurality of search points are repositioned in a direction and at a distance that is less than or equal to a variable value that satisfies a threshold sensitivity for the variable based on the target objective. The preceding subject matter of this paragraph characterizes example 15 of the present disclosure, wherein example 15 also includes the subject matter according to any one of examples 11-14, above.

The code is further executable by the processor to calculate one or more Lagrange values using various variable values along the direction of the repositioned search point to determine a sensitivity of the variable values along the direction up to the distance. The preceding subject matter of this paragraph characterizes example 16 of the present disclosure, wherein example 16 also includes the subject matter according to example 15, above.

The code is further executable by the processor to store information for one or more iterations of the surface to prevent re-searching within the area of the surface. The information comprises one or more of a size of the surface, the current variable values, the search time for that surface, and a percentage of the search space that the surface encompasses. The preceding subject matter of this paragraph characterizes example 17 of the present disclosure, wherein example 17 also includes the subject matter according to any one of examples 11-16, above.

The code is further executable by the processor to iteratively reposition the at least one search point of the plurality of search points to change the search area that the surface covers until the search criteria is satisfied. The search criteria comprises one or more of a search time, a percentage of search space, and achieving the target objective. The preceding subject matter of this paragraph characterizes example 18 of the present disclosure, wherein example 18 also includes the subject matter according to any one of examples 11-17, above.

The code is further executable by the processor to receive user input prior to defining the surface within the multi-dimensional search space. The user input comprises one or more of a random initial search point, a target objective, a search time constraint, and a percentage of the search space to be searched. The preceding subject matter of this paragraph characterizes example 19 of the present disclosure, wherein example 19 also includes the subject matter according to any one of examples 11-18, above.

Additionally, disclosed herein is a program product comprising a computer readable storage medium that stores code executable by a processor. The executable code comprising code to map a plurality of variable values of a database in a multi-dimensional search space. Each dimension corresponds to a variable of the database. The executable code also comprises code to define a surface within the multi-dimensional search space based on a plurality of search points defined by values for at least a pair of variables, the surface comprising a closed-loop, convex shape that defines an area of the multi-dimensional search space that has been searched. The executable code further comprises code to reposition at least one search point of the plurality of search points within the multi-dimensional search space based on a target objective. The at least one search point of the plurality of search points are moved a predefined distance in a direction of the target objective such that the shape of the surface is changed while maintaining a closed-loop, convex shape. The executable code additionally comprises code to report the variable values for the plurality of search points. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
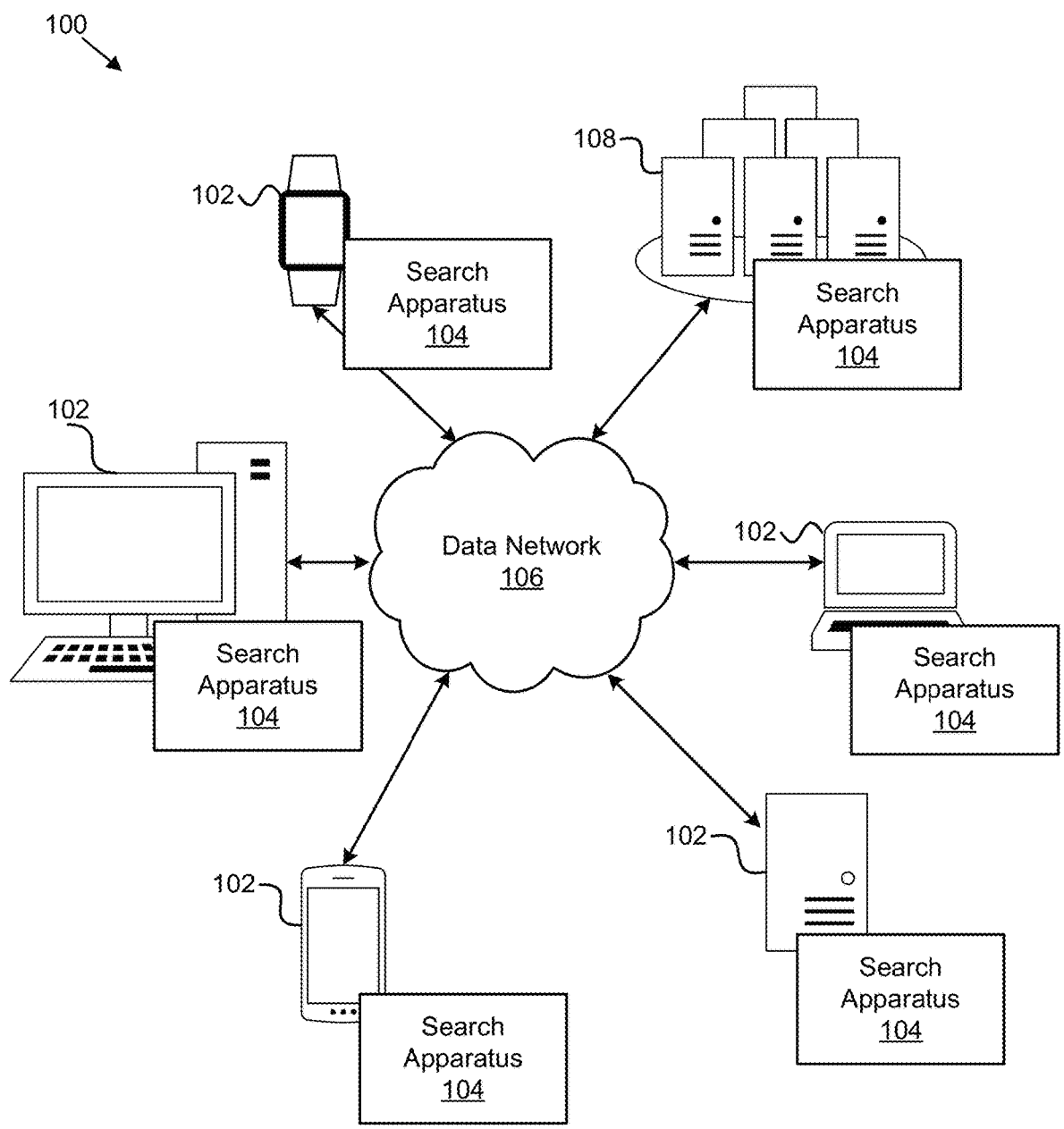
FIG. 1 is a schematic block diagram of a system for searching multimodal spaces, according to one or more examples of the present disclosure.

FIG. 1 is a schematic block diagram illustrating one embodiment of a system 100 for searching multimodal spaces. The system 100 includes one or more information handling devices 102, one or more search apparatuses 104, one or more data networks 106, and one or more servers 108. Even though a specific number of information handling devices 102, search apparatuses 104, data networks 106, and one or more servers 108 are depicted in FIG. 1, one of skill in the art will recognize, in light of this disclosure, that any number of information handling devices 102, search apparatuses 104, data networks 106, and one or more servers 108 may be included in the system 100.

The information handling devices 102 of the system 100 may include one or more of a desktop computer, a laptop computer, a tablet computer, a smart phone, a smart speaker (e.g., Amazon Echo®, Google Home®, Apple HomePod®), a security system, a set-top box, a gaming console, a smart TV, a smart watch, a fitness band or other wearable activity tracking device, an optical head-mounted display (e.g., a virtual reality headset, smart glasses, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium.

In certain embodiments, the information handling devices 102 are communicatively coupled to one or more other information handling devices 102 and/or, one or more servers 108 over the data network 106, described below. The information handling devices 102 may include processors, processor cores, and/or the like that are configured to execute various programs, program code, applications, instructions, functions, and/or the like for analyzing, processing, searching, mapping, and/or the like data sets such as extremely large data sets (e.g., Big Data). The data sets may be stored in a database, a data store, a repository, and/or the like stored locally, in the cloud, and/or some combination of both.

In one embodiment, the search apparatus 104 is configured to provide a deterministic global optimization method for searching multimodal, multi-dimensional, multivariate, or the like search spaces (e.g., data spaces) using a level-set method, or the like. In certain embodiments, the search apparatus is configured to map a plurality of variable values of a database in a multi-dimensional search space where each dimension corresponds to a variable of the database, define a surface within the multi-dimensional search space based on a plurality of search points, reposition the search points based on a target objective to change the size and shape of the surface, and report the variable values for the search points.

In one embodiment, the search apparatus 104 provides a solution to drawbacks in conventional methods of searching large data sets by allowing a more targeted and expansive search of the data sets for a target objective (e.g., a more accurate and/or more efficient solution to a search request) within a time constraint. In conventional methods for searching large datasets, searching an entirety of a large data set in a linear manner is usually not possible to complete within a given time period. Instead, the search apparatus 104 applies a hybrid optimization algorithm to a search process and blocks out sub-spaces within the global search space that have already been searched or do not include data related to the target objective using convex shape theory. Further, the search apparatus 104 searches the remaining unblocked search space using a stochastic approach. Accordingly, the search space for the data set can be searched in a more efficient, faster, and targeted manner.

In various embodiments, the search apparatus 104 may be embodied as a hardware appliance that can be installed or deployed on an information handling device 102, on a server 108, or elsewhere on the data network 106. In certain embodiments, the search apparatus 104 may include a hardware device such as a secure hardware dongle or other hardware appliance device (e.g., a set-top box, a network appliance, or the like) that attaches to a device, a laptop computer, a server 108, a tablet computer, a smart phone, a security system, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the search apparatus 104 may include a power interface, a wired and/or wireless network interface, a graphical interface that attaches to a display, and/or a semiconductor integrated circuit device as described below, configured to perform the functions described herein with regard to the search apparatus 104.

The search apparatus 104 may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the search apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the search apparatus 104.

The semiconductor integrated circuit device or other hardware appliance of the search apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the search apparatus 104 includes and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application and/or any others that might be developed after the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102. The one or more servers 108 may store data in data structures such as databases, data repositories, or the like.

Figure 2:
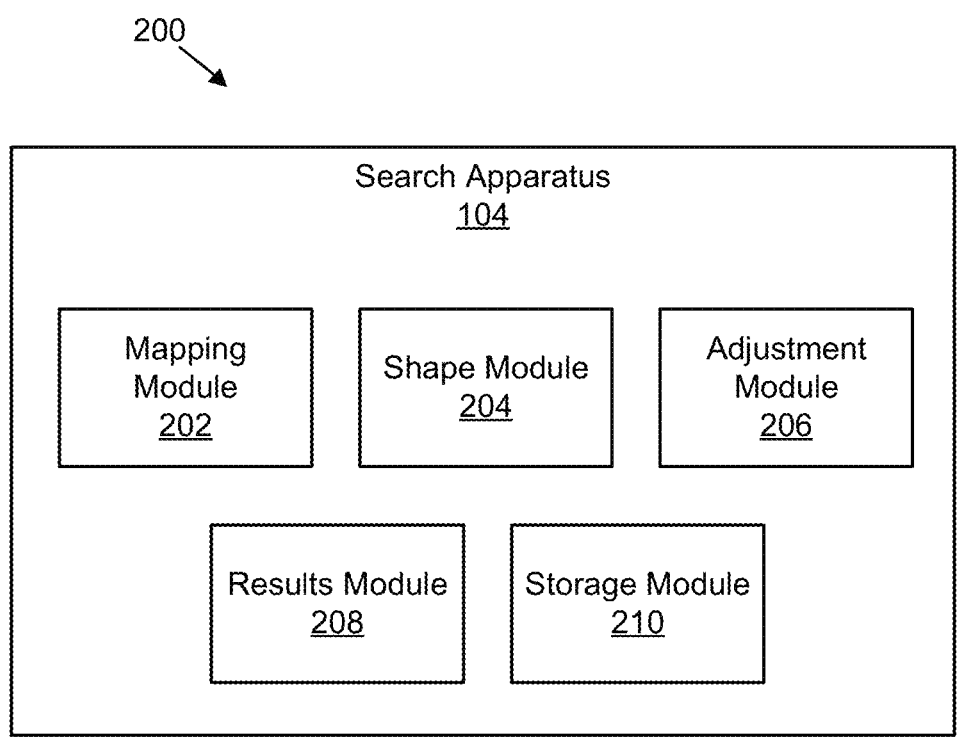
FIG. 2 is a schematic block diagram of an apparatus for searching multimodal spaces, according to one or more examples of the present disclosure.

FIG. 2 depicts one embodiment of an apparatus 200 for searching multimodal spaces. The apparatus 200 includes an embodiment of the search apparatus 104. The search apparatus 104, in certain implementations, includes one or more of a mapping module 202, a shape module 204, an adjustment module 206, a results module 208, and a storage module 210, which are described in more detail below.

The mapping module 202, in one embodiment, is configured to map a plurality of variable values of a database in a multi-dimensional search space. The database, data structure, data store, repository, or the like may include a plurality of different variables, features, parameters, or the like (e.g., each column of a database, spreadsheet, or the like). For example, the database may include data describing different parameters related to different flights of airplanes such as altitude, vibration, temperature, humidity, air pressure, and/ or the like.

In one embodiment, each dimension of the search space corresponds to a variable, parameter, or the like of the database. For example, if the database includes values for two variables A and B, each pair of values for A and B in the database may be mapped in a two dimensional search space (e.g., in an XY plane). In another example, if the data includes values for three variables A, B, and C, tuples of variables (e.g., (A,B,C)) may be mapped in a three-dimensional search space (e.g., in an XYZ space), and so on.

In certain embodiments, the mapping module 202 receives various user inputs to initially define the search space and the constraints for the search. The constraints may include a number of random initial search points (for parallelization); minimum, maximum, and/or mean of the data set; time constraints for the search (e.g., 500 seconds); an accuracy percentage; a percentage of search space to be covered; a target objective (e.g., minimizing or maximizing one or more variables); and/or the like.

Based on the inputs, parameters such as the maximum simplex size ("MSS") and the percentage of the search space that is searched can be adjusted. For instance, using the time constraint that defines how much time is allotted for searching the search space, the percent of the search space that is covered can be calculated to be equal to the percent of the time allotted. Based on the amount of time provided, the MSS can be adjusted to set how thoroughly each subset or sub-region of the search space can be searched. If there is more time, the MSS can be increased so that each subset or sub-region can be explored more carefully or thoroughly; with less time, each subset or sub-region may be quickly or superficially searched in order to complete the search by the allotted time.

In one embodiment, the shape module 204 is configured to define a surface within the multi-dimensional search space based on a plurality of search points defined by values for at least a pair of variables. For instance, the surface may comprise a circle, a sphere, a simplex shape, or other polygon, such that the surface is a closed-loop, convex shape that defines an area of the multi-dimensional search space that has been searched. The search points may comprise the vertices or other points along the boundary that correspond to a variable value, e.g., a variable pair or tuple, within the multi-dimensional search space.

In one embodiment, the shape module 204 is configured to initially define the surface by selecting a random starting point within the multi-dimensional search space, finding a first local minimum in the multi-dimensional search space using a multivariable, unconstrained optimization method from the starting search point, initiating one or more one-dimensional searches in equally spaced directions to locate one or more maxima points, and connecting the maxima points to form the surface comprising a simplex shape.

For example, from the starting point, which may be provided as input by a user or randomly selected, a multi-variable, unconstrained optimization method, such as a Broyden-Fletcher-Goldfarb-Shanno ("BFGS") optimization method, is used to find the first local minimum in the search space. From this minimum, n+1 one-dimensional searches are initiated in equally spaced directions (to determine the search points). For instance, for n=2, three new searches are initiated at 120° apart from one another. These searches, however, are seeking the maxima along fixed search directions with the goal of finding stationary points (e.g., one dimensional stationary points) that are located about the local minima.

The n+1 points are then connected together to form a simplex shape (e.g., a generalization of the notion of a triangle or tetrahedron to arbitrary dimensions). A simplex shape may have various properties that make it suited for searching large datasets. First, simplex shapes are inherently convex. Second, simplex shapes have edges between every possible combination of two vertices where a vertex is equivalent to a design, a solution, or a point within the search space. Third, simplex shapes are the simplest shapes that can be determined for an n-dimensional search space because they require only n+1 vertices as opposed to $n^2$ vertices for Cartesian prisms (e.g., rectangles). Finally, simplex shapes are defined by all possible combinations of n and the n+1 vertices.

A combination of golden section (the division of a line so that the whole is to the greater part as that part is to the smaller part (i.e., in a ratio of 1 to $\frac{1}{2}(\sqrt{5}+1)$)) with polynomial interpolation is used for the one-dimensional searches, which may both be quick and fairly robust. If the minimum is centered in the middle of the stationary points, then the resulting region is close to an equilateral simplex (e.g., an equilateral triangle in two-dimensions). The resulting region is stored by saving the n+1 maximizers, the one local minimizer, the value of the objective function at the minimum, and the volume of the simplex shape. This information is stored, as described below, to prevent future searches from revisiting the search space that has already been searched.

For instance, the simplex shape conservatively defines a region of the search space that is attracted to the previously discovered minimum, maximum, or median search point. From the n+1 faces of the simplex shape, n+1 new searches can be initiated. By averaging the vertices that comprise a particular face of the simplex shape, a midpoint of that face can be determined and used as the initial point in the new search. An initial search direction can also be provided by defining a direction from the new level set data set (of the previous adjacent region) through the midpoint. By finding a new starting point, the midpoint, and the search direction, the process can be repeated for each of the n+1 faces of the initial simplex region.

In certain embodiments, the shape module 204 is configured to initially define the surface by defining a circular surface within the multi-dimensional search space, selecting a predetermined number of points along a perimeter of the circular surface, and calculating a level-set partial differential equation using a Hamilton-Jacobi equation based on the selected predetermined number of points to calculate a new closed surface towards the target objective.

In one embodiment, the adjustment module 206 is configured to reposition at least one search point of the plurality of search points within the multi-dimensional search space based on a target objective. The adjustment module 206 may reposition the search points by moving them in a determined distance and direction of the target objective within the multi-dimensional search space, which may cause at least a portion of the surface to change (e.g., expand or decrease) while maintaining a closed-loop convex shape. In certain embodiments, the distance and direction are determined according to a level-set method. As used herein, a level-set method is based on a numerical method to simulate dynamic implicit surface changes and is defined using the Hamilton- Jacobi equation. The relation between the level-set method and shape/surface optimization is that the surface changes with respect to time.

In one embodiment, the adjustment module 206 repositions at least one search point of the plurality of search points by generating a closed surface comprising triangular surfaces based on the existing surface within the multi-dimensional search space using a Nelder-Mead method such that vertices of the triangular surfaces are adjacent vertices. Further, the adjustment module 206, in some embodiments, then determines a midpoint of each triangular surface, creates a linear vector from each of the closed-loop vertices to the midpoint of the opposing triangular surface, and defines a new closed-loop, convex shape using a predefined length of each linear vector based on ends of the linear vectors being vertices for the new closed-loop, convex shape.

In one embodiment, the adjustment module 206 repositions the at least one search point of the plurality of search points in a direction and at a distance that is less than or equal to a variable value that satisfies a threshold sensitivity for the variable based on the target objective. In such an embodiment, the adjustment module 206 calculates one or more Lagrange values using various variable values along the direction of the repositioned search point to determine a sensitivity of the variable values along the direction up to the distance. As used herein, variable sensitivity may refer to the effect that a change in one or more variable values has on another variable value within a pair, tuple, or more of variable values at a point within the multi-dimensional search space.

In one embodiment, the adjustment module 206 iteratively repositions the at least one search point of the plurality of search points to change the search area that the surface covers until search criteria is satisfied. In certain embodiments, the search criteria includes one or more of a search time, a percentage of search space, and achieving the target objective. In certain embodiments, machine learning algorithms may be used to learn from previous iterations and then generate a model and predict the next location for the search points of the boundary of the surface.

In one embodiment, the results module 206 is configured to report the variable values for the plurality of search points that satisfies the target objective. The results module 206, for instance, may generate a report, send a message comprising the variable values that satisfy the target objective, and/or the like. The variable values of the search points may be previously searched variable values, variable values for points that are along an edge of the surface, variable values for points that are within the search surface, or the like. For example, if the target objective is to determine an altitude to fly an airplane above 30,000 feet such that the vibration of an airplane is minimized, the results may include the best vibration and altitude that can be determined, based on the given constraints, by continuously expanding the search space of the search surface.

In one embodiment, the storage module 210 is configured to store information for each iteration of the surface to prevent re-searching within the area or volume of the surface. The information may comprise one or more of a size of the surface, the current variable values, the search time for that surface, and a percentage of the search space that the surface encompasses. Furthermore, the storage module 210 may store each simplex region of the simplex shape, described above, as n+1 points to define each vertex of the shape and a point of the minima, maximum, or median based on user input from the region, as shown below with reference to FIG. 4.

Figure 3:
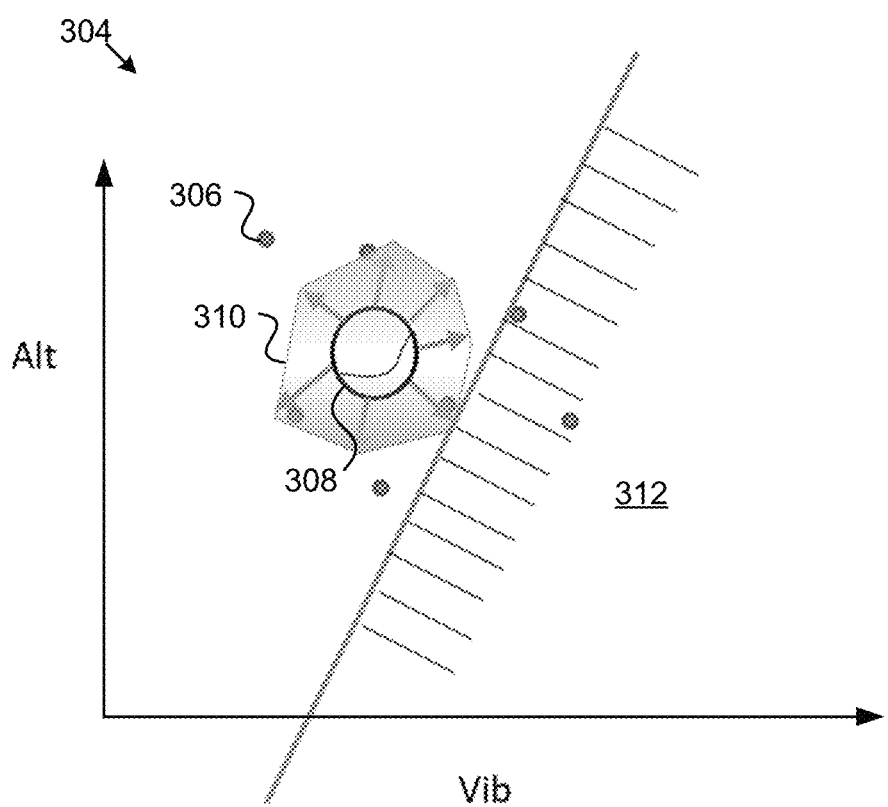
FIG. 3 illustrates one embodiment of an example of a search space surface for searching multimodal spaces, according to one or more examples of the present disclosure.

FIG. 3 illustrates one embodiment of an example of a search space surface for searching multimodal spaces. In one embodiment, a data set 302 may include flight information such as altitude and vibration. The goal or target objective may be to determine the highest altitude that provides the lowest vibration. The data set 302 includes two variables, altitude and vibration, with data collected for each variable from different flights. In certain embodiments, the data set 302 may comprise hundreds, thousands, millions, or the like flights, values (e.g., rows in the database), variables (e.g., columns in the database), or the like.

The mapping module 202 may map the data set 302 to a search space 304, a two-dimensional graph in this instance where each (altitude, vibration) pair being mapped onto the graph as a data point 306, the altitude comprising the y-axis and the vibration comprising the x-axis. The shape module 204 may initially define a circular surface 308, and the adjustment module 206 may employ a level-set method to reposition the search points on the perimeter of the circle and expand the circle boundaries to encompass more of the search area 310. If a constraint is provided for the vibration (e.g., vibration cannot exceed a certain threshold as the altitude increases), then a region 312 of the search space 304 can be blocked off from further search to improve efficiency and search time.

In another example embodiment, the target objective may be to determine a combination of parameters that may cause a landing gear alarm to trigger. The data set may include various parameters from multiple different flights such as the position of the landing gear (up, down as determined by a landing gear sensor), the altitude, the time frame for the flight, and the hydraulic pressure. Each of these parameters would need to be searched in a large database; however, the data may be noisy (e.g., the data may include other meaningless data), which makes it difficult to extract the desired data in a reasonable amount of time.

The parameters may be as follows:
  i. Check whether the landing gear sensor indicates that the landing gear is down for at least 10 seconds: landing_gear_down=1 for 10 seconds;
  ii. Check whether the altitude of the airplane is greater than 10,000 feet: altitude>10,000 feet;
  iii. Check whether the time frame for the flight is greater than an hour and less than a day: end_time−start_time>1 hour AND end_time−start_time<1 day;
  iv. Check whether the hydraulic system pressure is greater than 600 pounds per square inch ("psi"): hydraulic_system_pressure>100 psi; and
  v. Check whether the difference between the maximum and minimum hydraulic system pressure is less than 600 psi−(hydraulic_system_pressure_max−hydraulic_system_pressure_min)<600 psi In this example, the mapping module 202 would map data for the foregoing parameters—altitude, hydraulic pressure, landing gear sensor, and time of day to a search space. The time frame would comprise the golden section. The hydraulic pressure and altitude would be additional constraints. Using the inputs above, the following target objective may be generated and substituted for $v_n$ in the level set equation $\emptyset_\tau + v_n |\nabla \emptyset| = 0$ to solve the partial differential equation:

Objective[Lagrange($J(X,\text{Phi})$)]:$X1$*(Delta((hydraulic_system_pressure_max−hydraulic_system_pressure_min))−600 psi)+$X2$*(hydraulic_system_pressure−100 psi)+$X3$*(Altitude−10000), where Phi is the surface defined in the level set.

The output from the level set equation would be setoff data for the next simplex region. The simplex shape will then change with respect to the objective.

Figure 4:
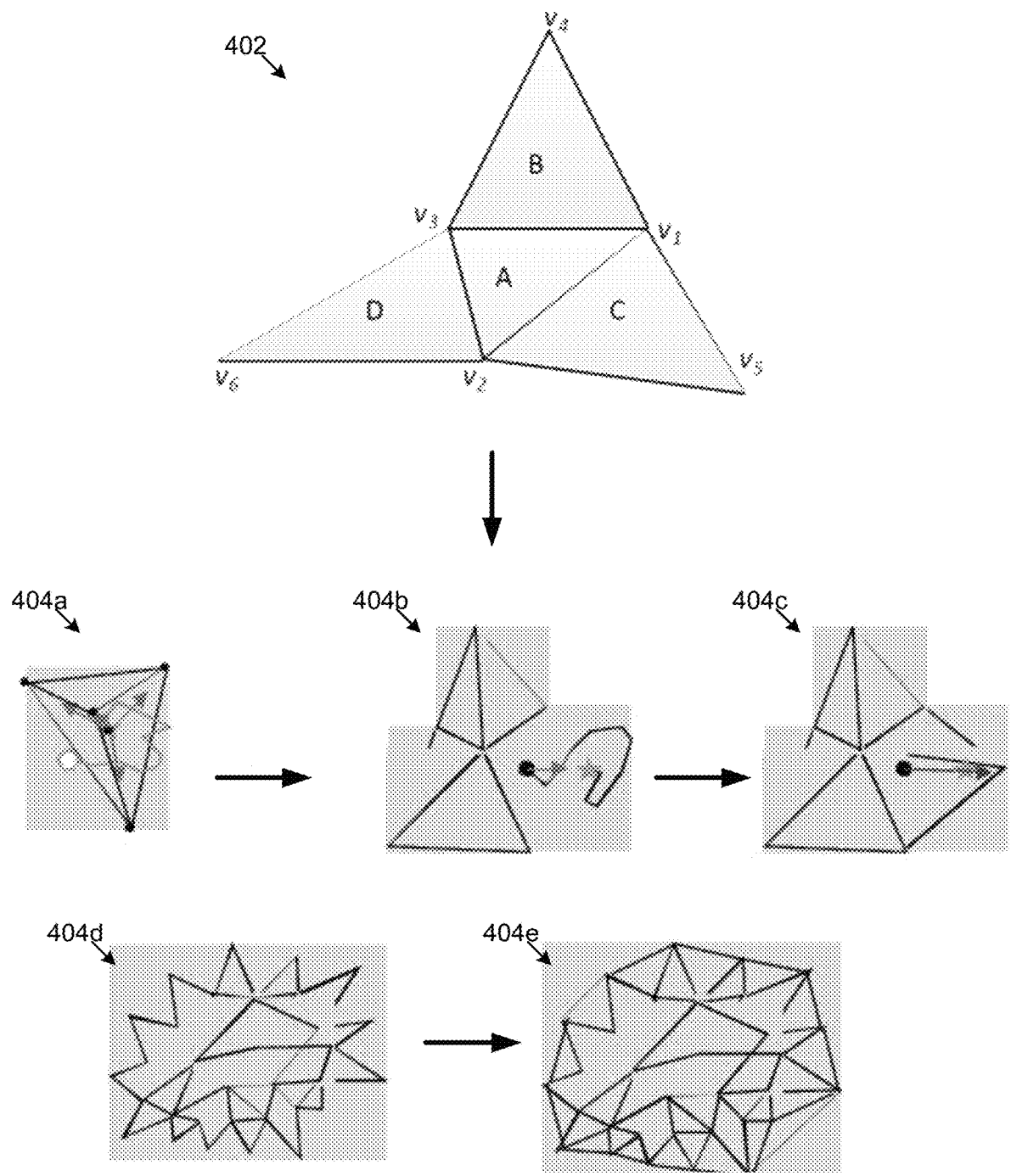
FIG. 4 illustrates one embodiment of an example search surface expansion for searching multimodal spaces, according to one or more examples of the present disclosure.

FIG. 4 illustrates one embodiment of an example of a search space surface for searching multimodal spaces. In one embodiment, the surface includes a simplex surface 402. The simplex surface 402 may be defined by a number of regions A-D, which are defined by various vertices $v_1$-$v_6$.

For instance, for two variables, X and Y, simplex regions may be defined as a set of vertices and functions:

A: [$v_1$, $v_2$, $v_3$, v*A, f(v*A)]
B: [$v_3$, $v_4$, v*B, f(v*B)]
C: [$v_2$, $v_5$, v*C, f(v*C)]
D: [$v_6$, $v_2$, $v_3$, v*D, f(v*D)]
. . .

where $v_i$=[$x_i$,$y_i$]

For n variables, $x_1$, $x_2$, $x_3$, . . . $x_n$, simplex regions may be defined as a set of vertices and functions:

A: [$v_1$, $v_2$, . . . $v_n$, $v_{n+1}$, v*A, f(v*A)]
B: [$v_1$, $v_2$, . . . $v_n$, $v_{n+1}$, v*B, f(v*B)]
. . .

where $v_i$=[$x_{i1}$, $x_{i2}$, $x_{i3}$, . . . , $x_{in}$]

As discussed earlier, the simplex shape conservatively defines a region of the search space that is associated with the previously discovered minimum, maximum, or median search point. From the n+1 faces of the simplex shape, n+1 new searches can be initiated. By averaging the vertices that comprise a particular face of the simplex shape, a midpoint of that face can be determined and used as the initial point in the new search. An initial search direction can also be provided by defining a direction from the new level set data set (of the previous adjacent region) through the midpoint (404b).

By finding a new starting point, the midpoint, and the search direction, the process can be repeated for each of the n+1 faces of the initial simplex region. A new simplex region is created by performing a one-dimensional search along the search direction defined by the starting point and resulting minima to find a new maximum point and generating a new simplex shape (404c).

For instance, after the first minimum is found, four maxima are located in equally spaced directions 404a. New minima and the resulting simplex regions are defined on each of the original free faces 404b, 404c. In certain embodiments, the level-set method is used to predict the next iteration points based on the user's requirements or search constraints. These data points are used for the next simplex regions. After iterating n times, the set of visited regions may be large and concave 404d. To account for the concavity of the simplex structure, a convex hull is defined for the structure 404e.

The golden section is used to constrain the regions for the next iterations of the level-set method. Because the level-set method requires a bracketing of a suspected local maxima, it is necessary to prescribe an upper limit, which is known herein as the MSS. This adjustment parameters, as explained above, allows users to change the size of search sectioning with respect to complexity of the problem and the time allotted. For small values of MSS, more simplex shapes will be created and searched, and hence more time will be required to reach a target percentage of the search space ("PSS"). For larger values of MSS, larger simplex shapes will be created, which will likely speed up the search process, but may miss some local optima. Changing the values of MSS and PSS depends on how complex the problem is and how much time one wants to spend finding the data point values. Furthermore, these two adjustment parameters may change throughout a single search process. In this manner, the search process can be improved to increase effectiveness and efficiency, while only requiring the user to provide, at most, a time constraint for the search.

The storage module 210 may store each n+1 unique solutions or vertices, along with the local minimizer and the value at the local minimum for later reference (e.g., for calculation of the next iteration of expanding the simplex shape, to prevent future searching within the region, or the like).

Figure 5:
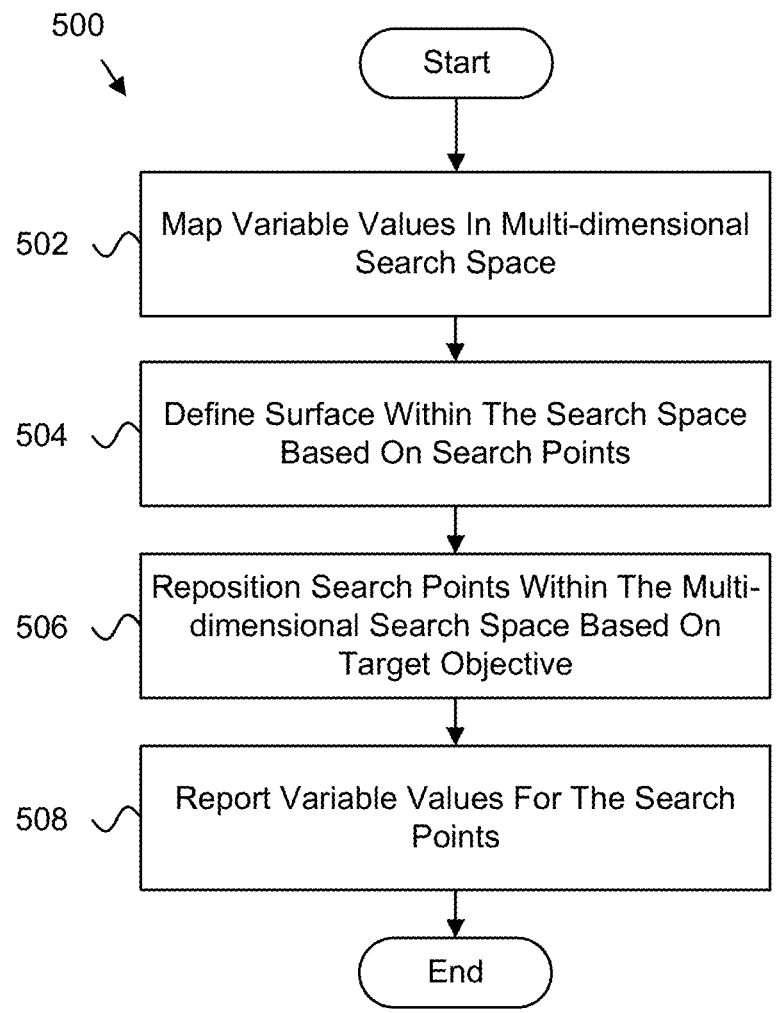
FIG. 5 is a schematic flow diagram of a method for searching multimodal spaces, according to one or more examples of the present disclosure.

FIG. 5 is a schematic flow-chart diagram illustrating one embodiment of a method 500 for searching multimodal spaces. The method 500 begins, and maps 502 a plurality of variable values of a database in a multi-dimensional search space. In one embodiment, the method 500 defines 504 a surface within the multi-dimensional search space based on a plurality of search points defined by values for at least a pair of variables. The surface may comprise a closed-loop, convex shape that defines an area of the multi-dimensional search space that has been searched.

In further embodiments, the method 500 repositions 506 at least one search point of the plurality of search points within the multi-dimensional search space based on a target objective. The one or more of the plurality of search points are moved a predefined distance in a direction of the target objective such that the shape of the surface is changed while maintaining a closed-loop, convex shape. In one embodiment, the method 500 reports 508 the variable values for the plurality of search points, and the method 500 ends. In one embodiment, the mapping module 202, the shape module 204, the adjustment module 206, and/or the results module 208, performs the various steps of the method 500.

Figure 6:
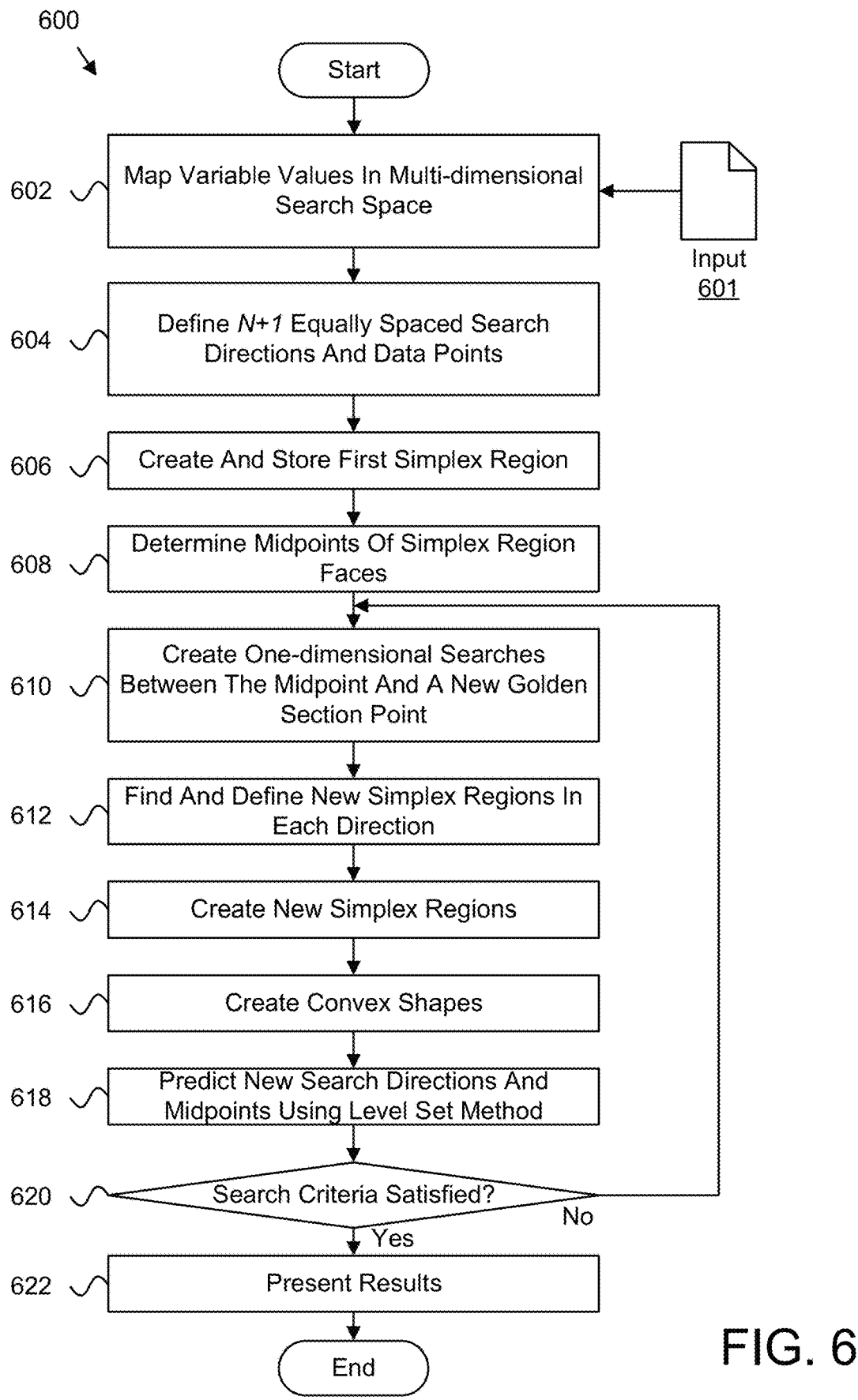
FIG. 6 is a schematic flow diagram of a method for searching multimodal spaces, according to one or more examples of the present disclosure.

FIG. 6 is a schematic flow-chart diagram illustrating one embodiment of a method 600 for searching multimodal spaces. The method 600 begins and maps 602 a plurality of variable values of a database in a multi-dimensional search space. The method 600 may use various inputs 601 for defining the search space and other searching parameters. The inputs 601 may include a number of random initial search points, a time constraint, a percentage of the search space to search, and a target objective (e.g., minimum, maximum, median, etc.). The method 600 defines 604 n+1 equally spaced search directions and data points using the golden section, and creates 606 and stores the first simplex region.

The method 600 determines 608 the midpoints of the simplex region faces for the next iteration, and creates 610 one-dimensional searches between the midpoint and the new golden section point. The method 600 finds 612 and defines new simplex regions in each direction. The method 600 creates 614 the new simplex region and stores it for later reference and future calculations. The method 600 creates 616 additional convex simplex shapes (e.g., using a Q-hull algorithm). The method 600 predicts 618 new search directions and midpoints using a level set method (e.g., and possibly using machine learning to generate the predictions).

The method 600 determines 620 whether the search criteria has been satisfied such as the search time, the target objective, the percentage of the search space that is searched, and/or the like. If not, then the method 600 goes through another iteration of creating new simplex regions to expand the simplex shape. Otherwise, the method 600 presents 622 the results, e.g., the most accurate variable values for the target objective given the constraints, and the method 600 ends. In one embodiment, the mapping module 202, the shape module 204, the adjustment module 206, the results module 208, and/or the storage module 210 performs the various steps of the method 600.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Embodiments of the various modules may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

The modules may be implemented as a hardware circuit comprising custom very-large-scale integration (VLSI) circuits or gate arrays, off-the-shelf semiconductors such as logic chips, transistors, or other discrete components. The modules may also be implemented in programmable hardware devices such as field programmable gate arrays, programmable array logic, programmable logic devices or the like.

The modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized by the modules. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method, comprising:
   mapping a plurality of variable values of a database in a multi-dimensional search space, each dimension corresponding to a variable of the database;
   defining a surface within the multi-dimensional search space based on a plurality of search points defined by values for at least a pair of variables, the surface comprising a closed-loop, convex shape that defines an area of the multi-dimensional search space that has been searched;
   repositioning at least one search point of the plurality of search points within the multi-dimensional search space based on a target objective, the at least one search point of the plurality of search points moved a predefined distance in a direction of the target objective such that the shape of the surface is changed while maintaining a closed-loop, convex shape; and
   reporting the variable values for the plurality of search points.

2. The method according to claim 1, further comprising initially defining the surface by:
   selecting a random starting search point within the multi-dimensional search space;
   finding a first local minimum in the multi-dimensional search space using a multivariable, unconstrained optimization method from the starting search point;
   initiating one or more one-dimensional searches in equally spaced directions to locate one or more maxima points; and
   connecting the maxima points to form the surface, the surface comprising a simplex shape.

3. The method according to claim 1, further comprising initially defining the surface using a level-set method by:
   defining a circular surface within the multi-dimensional search space;
   selecting a predetermined number of points along a perimeter of the circular surface; and
   calculating a partial differential equation using a Hamilton-Jacobi equation using the selected predetermine number of points to calculate a new closed surface towards the target objective.

4. The method according to claim 1, further comprising repositioning at least one search point of the plurality of search points by:
   generating a closed surface comprising triangular surfaces based on an existing surface within the multi-dimensional search space using a Nelder-Mead method such that vertices of the triangular surfaces are adjacent vertices;
   determining a midpoint of each triangular surface;
   creating a linear vector from each of the vertices to the midpoint of an opposing triangular surface; and
   defining a new closed-loop, convex shape using a predefined length of each linear vector based on ends of the linear vectors being vertices for the new closed-loop, convex shape.

5. The method according to claim 1, wherein the at least one search point of the plurality of search points is repositioned in a direction and at a distance that is less than or equal to a variable value that satisfies a threshold sensitivity for the variable based on the target objective.

6. The method according to claim 5, further comprising calculating one or more Lagrange values using various variable values along the direction of the repositioned search point to determine sensitivity of the variable values along the direction up to the distance.

7. The method according to claim 1, further comprising storing information for one or more iterations of the surface to prevent re-searching within the area of the surface, the information comprising one or more of a size of the surface, current variable values, a search time for that surface, and a percentage of the multi-dimensional search space that the surface encompasses.

8. The method according to claim 1, further comprising iteratively repositioning the at least one search point of the plurality of search points to change the area that the surface covers until search criteria is satisfied.

9. The method according to claim 8, wherein the search criteria comprises one or more of a search time, a percentage of search space, and achieving the target objective.

10. The method according to claim 1, further comprising receiving user input prior to defining the surface within the multi-dimensional search space, the user input comprising one or more of a random initial search point, a target objective, a search time constraint, and a percentage of the search space to be searched.

11. An apparatus, comprising:
a processor;
a memory that stores code executable by the processor to:
map a plurality of variable values of a database in a multi-dimensional search space, each dimension corresponding to a variable of the database;
define a surface within the multi-dimensional search space based on a plurality of search points defined by values for at least a pair of variables, the surface comprising a closed-loop, convex shape that defines an area of the multi-dimensional search space that has been searched;
reposition at least one search point of the plurality of search points within the multi-dimensional search space based on a target objective, the at least one search point of the plurality of search points moved a predefined distance in a direction of the target objective such that a shape of the surface is changed while maintaining a closed-loop, convex shape; and
report the variable values for the plurality of search points.

12. The apparatus according to claim 11, wherein the code is further executable by the processor to initially define the surface by:
selecting a random starting search point within the multi-dimensional search space;
finding a first local minimum in the multi-dimensional search space using a multivariable, unconstrained optimization method from the starting search point;
initiating one or more one-dimensional searches in equally spaced directions to locate one or more maxima points; and
connecting the maxima points to form the surface, the surface comprising a simplex shape.

13. The apparatus according to claim 11, wherein the code is further executable by the processor to initially define the surface using a level-set method by:
defining a circular surface within the multi-dimensional search space;
selecting a predetermined number of points along a perimeter of the circular surface; and
calculating a partial differential equation using a Hamilton-Jacobi equation using the selected predetermine number of points to calculate a new closed surface towards the target objective.

14. The apparatus according to claim 11, wherein the code is further executable by the processor to reposition at least one search point of the plurality of search points by:
generating a closed surface comprising triangular surfaces based on an existing surface within the multi-dimensional search space using a Nelder-Mead method such that vertices of the triangular surfaces are adjacent vertices;
determining a midpoint of each triangular surface;
creating a linear vector from each of the vertices to the midpoint of an opposing triangular surface; and
defining a new closed-loop, convex shape using a predefined length of each linear vector based on ends of the linear vectors being vertices for the new closed-loop, convex shape.

15. The apparatus according to claim 11, wherein the at least one search point of the plurality of search points is repositioned in a direction and at a distance that is less than or equal to a variable value that satisfies a threshold sensitivity for the variable based on the target objective.

16. The apparatus according to claim 15, wherein the code is further executable by the processor to calculate one or more Lagrange values using various variable values along the direction of the repositioned search point to determine sensitivity of the variable values along the direction up to the distance.

17. The apparatus according to claim 11, wherein the code is further executable by the processor to store information for one or more iterations of the surface to prevent re-searching within the area of the surface, the information comprising one or more of a size of the surface, current variable values, a search time for the surface, and a percentage of the multi-dimensional search space that the surface encompasses.

18. The apparatus according to claim 11, wherein the code is further executable by the processor to iteratively reposition the at least one search point of the plurality of search points to change the search area that the surface covers until search criteria is satisfied, the search criteria comprising one or more of a search time, a percentage of search space, and achieving the target objective.

19. The apparatus according to claim 11, wherein the code is further executable by the processor to receive user input prior to defining the surface within the multi-dimensional search space, the user input comprising one or more of a random initial search point, a target objective, a search time constraint, and a percentage of the search space to be searched.

20. A program product comprising a computer readable storage medium that stores code executable by a processor, the executable code comprising code to:
map a plurality of variable values of a database in a multi-dimensional search space, each dimension corresponding to a variable of the database;
define a surface within the multi-dimensional search space based on a plurality of search points defined by values for at least a pair of variables, the surface comprising a closed-loop, convex shape that defines an area of the multi-dimensional search space that has been searched;
reposition at least one search point of the plurality of search points within the multi-dimensional search space based on a target objective, the at least one search point of the plurality of search points moved a predefined distance in a direction of the target objective such that the shape of the surface is changed while maintaining a closed-loop, convex shape; and
report the variable values for the plurality of search points.

* * * * *